(12) United States Patent
Gandolfo et al.

(10) Patent No.: US 11,209,083 B2
(45) Date of Patent: Dec. 28, 2021

(54) SELF-SEALING MEMBRANE SLEEVE ASSEMBLY

(71) Applicant: Specified Technologies Inc., Somerville, NJ (US)

(72) Inventors: Paul Gandolfo, Doylestown, PA (US); Michael Joyce, Levittown, PA (US)

(73) Assignee: Specified Technologies Inc., Somerville, NJ (US)

( * ) Notice: Subject to any disclaimer, the term of this patent is extended or adjusted under 35 U.S.C. 154(b) by 340 days.

(21) Appl. No.: 16/249,108

(22) Filed: Jan. 16, 2019

(65) Prior Publication Data

US 2019/0219170 A1 Jul. 18, 2019

Related U.S. Application Data

(60) Provisional application No. 62/618,723, filed on Jan. 18, 2018.

(51) Int. Cl.
| | |
|---|---|
| *F16J 15/02* | (2006.01) |
| *A62C 2/06* | (2006.01) |
| *F16L 5/04* | (2006.01) |
| *F16L 5/10* | (2006.01) |
| *H02G 3/22* | (2006.01) |
| *F16L 5/14* | (2006.01) |

(52) U.S. Cl.
CPC ............ *F16J 15/022* (2013.01); *F16L 5/04* (2013.01); *F16L 5/10* (2013.01); *H02G 3/22* (2013.01); *A62C 2/065* (2013.01); *F16L 5/14* (2013.01)

(58) Field of Classification Search
CPC ...... F16L 5/04; F16L 5/10; F16L 5/14; H02G 3/22; A62C 2/065; E04B 2002/7488; E04B 2/7411; E04B 2/7457; E04B 1/947; E04B 5/48; F16J 15/022
See application file for complete search history.

(56) References Cited

U.S. PATENT DOCUMENTS

| | | | | |
|---|---|---|---|---|
| 2,832,406 | A * | 4/1958 | Turenne | E06B 7/32 160/179 |
| 4,350,198 | A * | 9/1982 | Naegeli | E06B 7/32 160/179 |
| 4,938,169 | A * | 7/1990 | Barmakian | A01K 1/035 119/484 |
| 6,928,777 | B2 * | 8/2005 | Cordts | H02G 3/0412 52/220.8 |

* cited by examiner

*Primary Examiner* — Gilbert Y Lee
(74) *Attorney, Agent, or Firm* — Massina Pat & TM Law PLLC (57) ABSTRACT

A sealing membrane assembly including a flange having a body with a through passage. A first sealing membrane defines a first flexible panel with a first axial sealed opening extending therethrough. The first axial sealed opening extends at an acute angle. A second sealing membrane defines a second flexible panel with a second axial sealed opening extending therethrough. The second axial sealed opening extends at an obtuse angle. The first and second sealing membranes are secured relative to the flange such that the first and second axial sealed openings crisscross one another and the first and second sealing membranes seal the through passage except through the first and second sealed openings.

20 Claims, 9 Drawing Sheets

SELF-SEALING MEMBRANE SLEEVE ASSEMBLY

This application claims the benefit of U.S. Provisional Appln. No. 62/618,723, filed on Jan. 18, 2018, the contents of which are incorporated herein by reference.

FIELD OF THE INVENTION

The invention generally relates to apparatus for providing sealing of a construction opening and, more particularly, to a sealing membrane sleeve assembly configured to form a seal about penetrating members passing through the construction opening.

BACKGROUND OF THE INVENTION

It is commonplace in the construction and renovation of commercial and residential buildings for the need to pass cables, conduits and the like through construction barriers such as walls, floors and ceilings. However, the presence of an opening through such barriers provides a potential passage for smoke and noise.

Often the openings will include a sleeve extending therethough to guide passage of cables or the like. The sleeves are typically short lengths of metal conduit, pipe, or EMT that project through a barrier. The NEC (NFPA 70) defines a sleeve to be a short length of raceway used to support and protect cables. While the sleeves support and protect the cables, the opening therethrough still may allow for passage of smoke and noise.

While there have been attempts to seal the ends of the sleeve, many such attempts often have difficulty maintain a proper seal as cable moves, adds, and changes are made to the structured cabling.

Accordingly, there is a need for a sleeve sealing assembly that adjusts to and maintains a proper seal even as the number and size of cables passing therethrough changes.

SUMMARY OF THE INVENTION

In at least one embodiment, the present invention provides a sealing membrane assembly including a flange having a body with a through passage. A first sealing membrane defines a first flexible panel with a first axial sealed opening extending therethrough. The first axial sealed opening extends at an acute angle. A second sealing membrane defines a second flexible panel with a second axial sealed opening extending therethrough. The second axial sealed opening extends at an obtuse angle. The first and second sealing membranes are secured relative to the flange such that the first and second axial sealed openings crisscross one another and the first and second sealing membranes seal the through passage except through the first and second sealed openings.

In at least one embodiment, the present invention provides a self-sealing membrane sleeve assembly including a sleeve member having a tubular body extending between first and second ends. A first sealing membrane assembly is secured to the first end of the tubular body and a second sealing membrane assembly is secured to the second end of the tubular body. The first and second sealing membranes each include a flange having a body with a through passage. A first sealing membrane defines a first flexible panel with a first axial sealed opening extending therethrough. The first axial sealed opening extends at an acute angle. A second sealing membrane defines a second flexible panel with a second axial sealed opening extending therethrough. The second axial sealed opening extends at an obtuse angle. The first and second sealing membranes are secured relative to the flange such that the first and second axial sealed openings crisscross one another and the first and second sealing membranes seal the through passage except through the first and second sealed openings.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Referring to FIGS. 1-13, a self-sealing membrane sleeve assembly 10 in accordance with an exemplary embodiment of the invention will be described. In the illustrated embodiment, the assembly 10 generally includes a sleeve member 20 positioned between a pair of sealing membrane assemblies 30. As will be described in more detail hereinafter, the sleeve member 20 of the illustrated embodiment has a telescoping configuration with an outer portion 22 and an inner portion 32. However, the invention is not limited to such and the sleeve member 20 may have various configurations, for example, a continuous tubular body, and various shapes, for example, oval, circular, square or the like. While the illustrated embodiment is described as a sleeve assembly including the sealing membrane assemblies 30 and the sleeve member 20, the sealing membrane assemblies 30 may be configured to engage and secure to the ends of pre-existing sleeve members. Additionally, while the illustrated embodiment is described in terms of providing smoke and acoustical protection, it is recognized that the assembly will also provide protection against passage of fire and super-heated gases. Additionally, the assembly could also integrate intumescent materials, for example, positioned in the sleeve or supported by the flanges, to provide a fire-rated version of the assembly.

Referring to FIGS. 2-6, an exemplary sleeve member 20 will be described. In this embodiment, the sleeve member 20 has a telescoping configuration with an outer portion 22 and an inner portion 32. The telescoping configuration of the sleeve member 20 also the sleeve member 20 expand to any length between the contracted configuration illustrated in FIG. 2 and the expanded configuration illustrated in FIG. 3. Such a configuration allows the assembly 10 to be utilized with walls or other structures of different widths or thicknesses.

Figure 4:
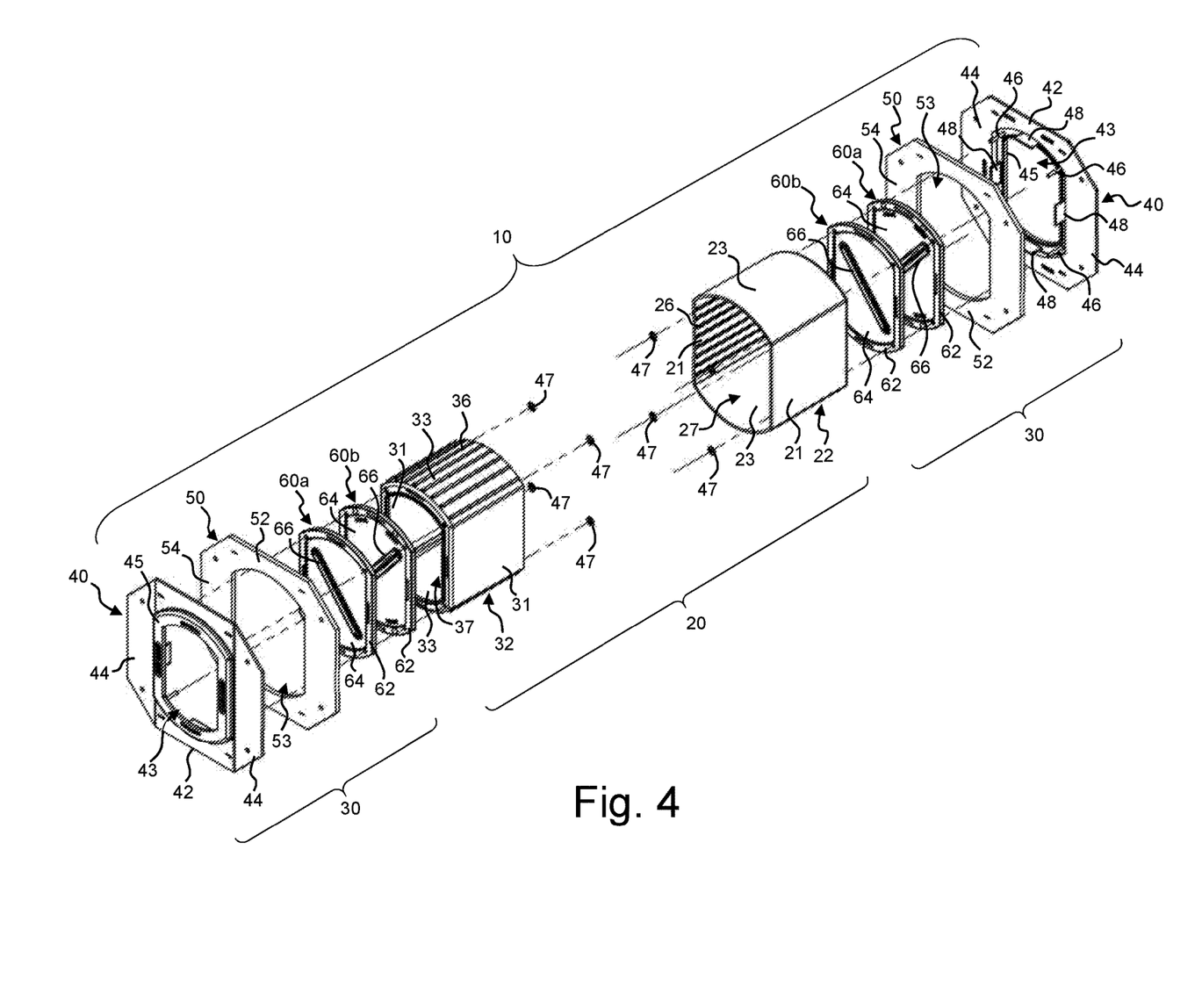
FIG. 4 is an exploded perspective view of the self-sealing membrane sleeve assembly of FIG. 1.
Figure 5:
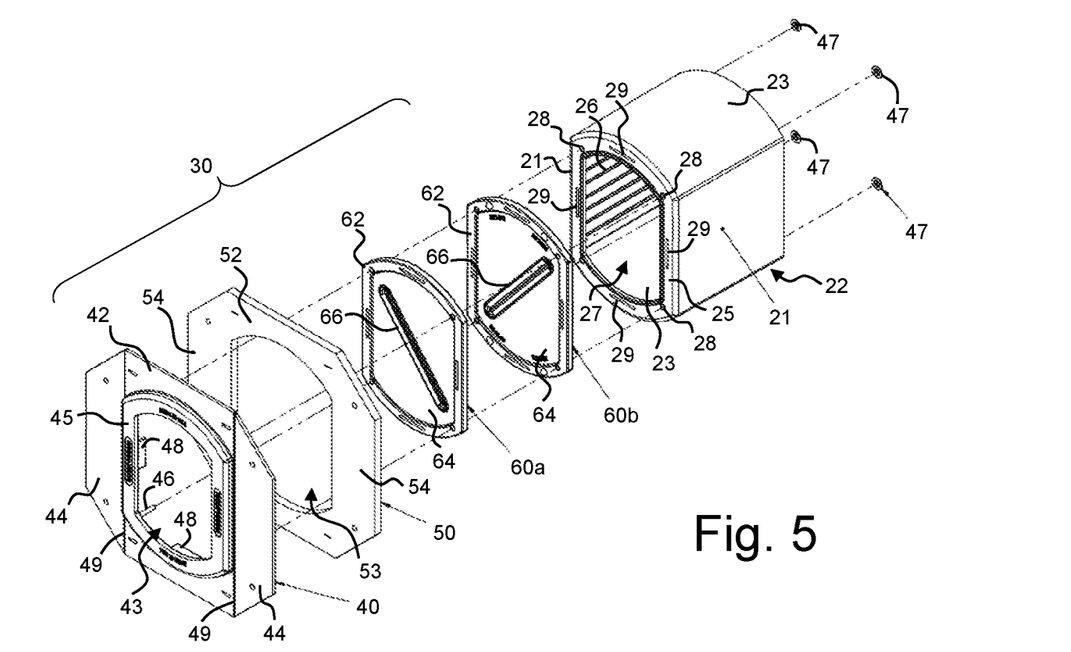
FIG. 5 is an exploded perspective view of an outer portion of an exemplary sleeve member and an exemplary sealing membrane assembly.
Figure 6:
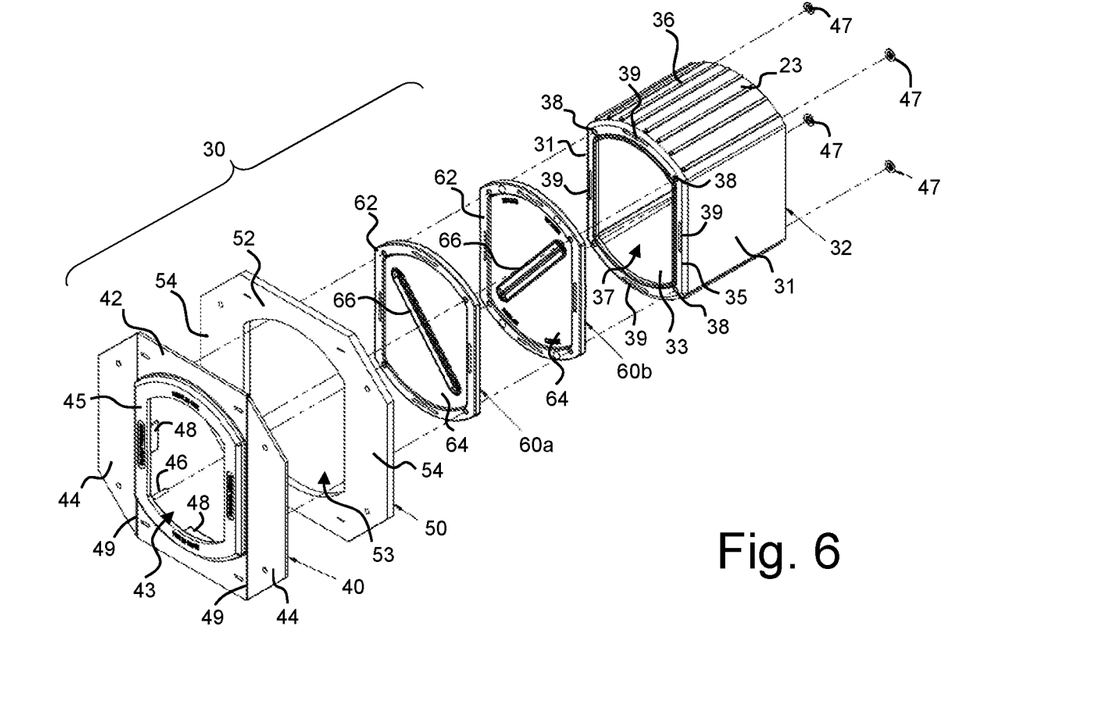
FIG. 6 is an exploded perspective view of an inner portion of the exemplary sleeve member and an exemplary sealing membrane assembly.

The telescoping sleeve member 20 will be described in more detail with reference to FIGS. 4-6. The outer portion 22 of the sleeve member 20 includes opposed side walls 21 extending between top and bottom walls 23 with a passage 27 therethrough. While the illustrated embodiment includes linear side walls 21 and arcuate top and bottom walls 23 to define an oval shape, the invention is not limited to such and the outer portion 22 may have any desired shape. Similarly, the inner portion 32 of the sleeve member 20 includes opposed side walls 31 extending between top and bottom walls 33 with a passage 37 therethrough. The inner portion 32 has a configuration which compliments the outer portion 22 such that the inner portion 32 slides within the passage 27 of the outer portion 22 such that the length of the sleeve member 20 is telescopically adjustable. In the illustrated embodiment, the side walls 21 have internal ribs 26 and the top and bottom walls 33 have external ribs 36. The ribs 26, 36 provide a friction fit between the outer and inner portions 22, 32 to maintain the sleeve member 20 in an assembled configuration. The linearly outer end of each portion 22, 32 defines a respective support face 25, 35 configured to support a respective flange 40. In the illustrated embodiment, each support face 25, 35 has a plurality of connector openings 28, 38 and a plurality of tab openings 29, 39, the functions of which will be described in more detail below.

Referring to FIGS. 5-11, an exemplary sealing membrane assembly 30 will be described. The sealing membrane assembly 30 generally includes a mounting flange 40 and a pair of sealing membranes 60a, 60b. While a pair of sealing membranes is illustrated, more or fewer than two sealing membranes may be utilized. As illustrated, a foam gasket 50 may be supported by the flange 40 to seal between the structure opening and the assembly (see FIGS. 12 and 13).

Figure 7:
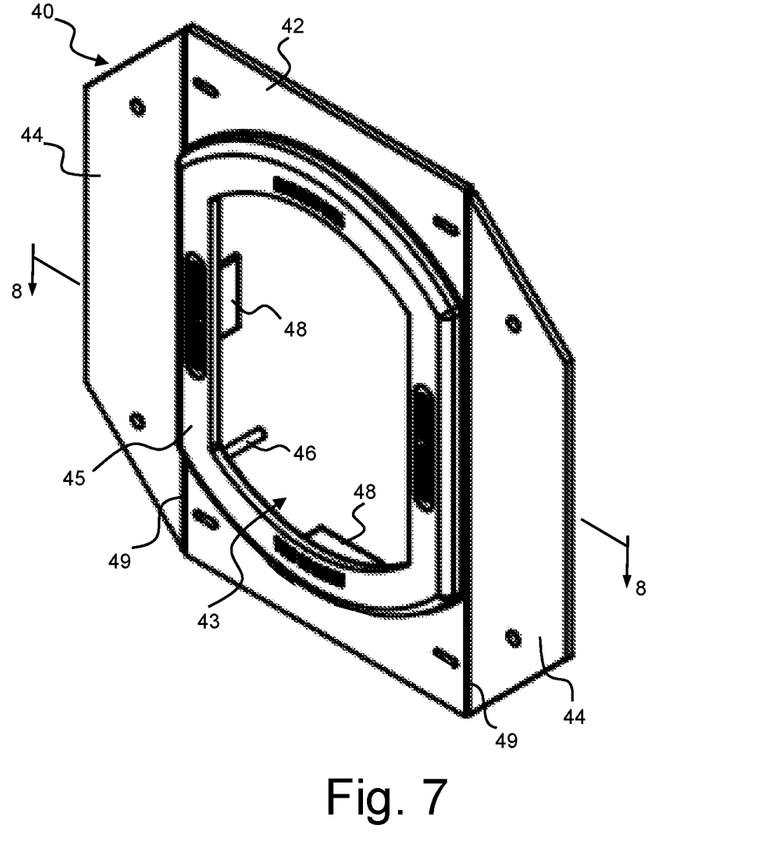
FIG. 7 is a perspective view of an exemplary flange.
Figure 8:
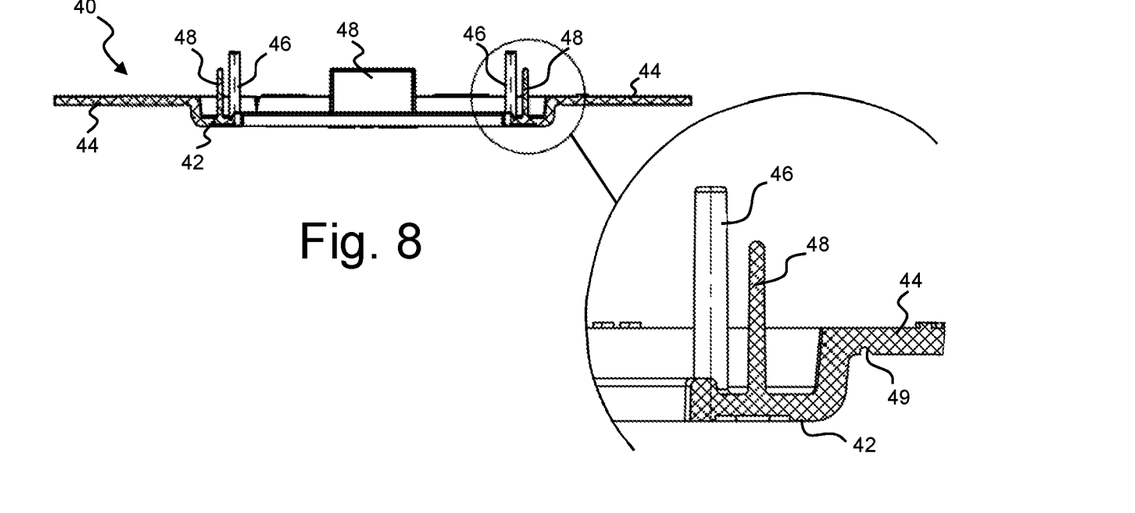
FIG. 8 is a cross-sectional view along the line 8-8 in FIG. 7, with a portion thereof shown in an expanded view.
Figure 12:
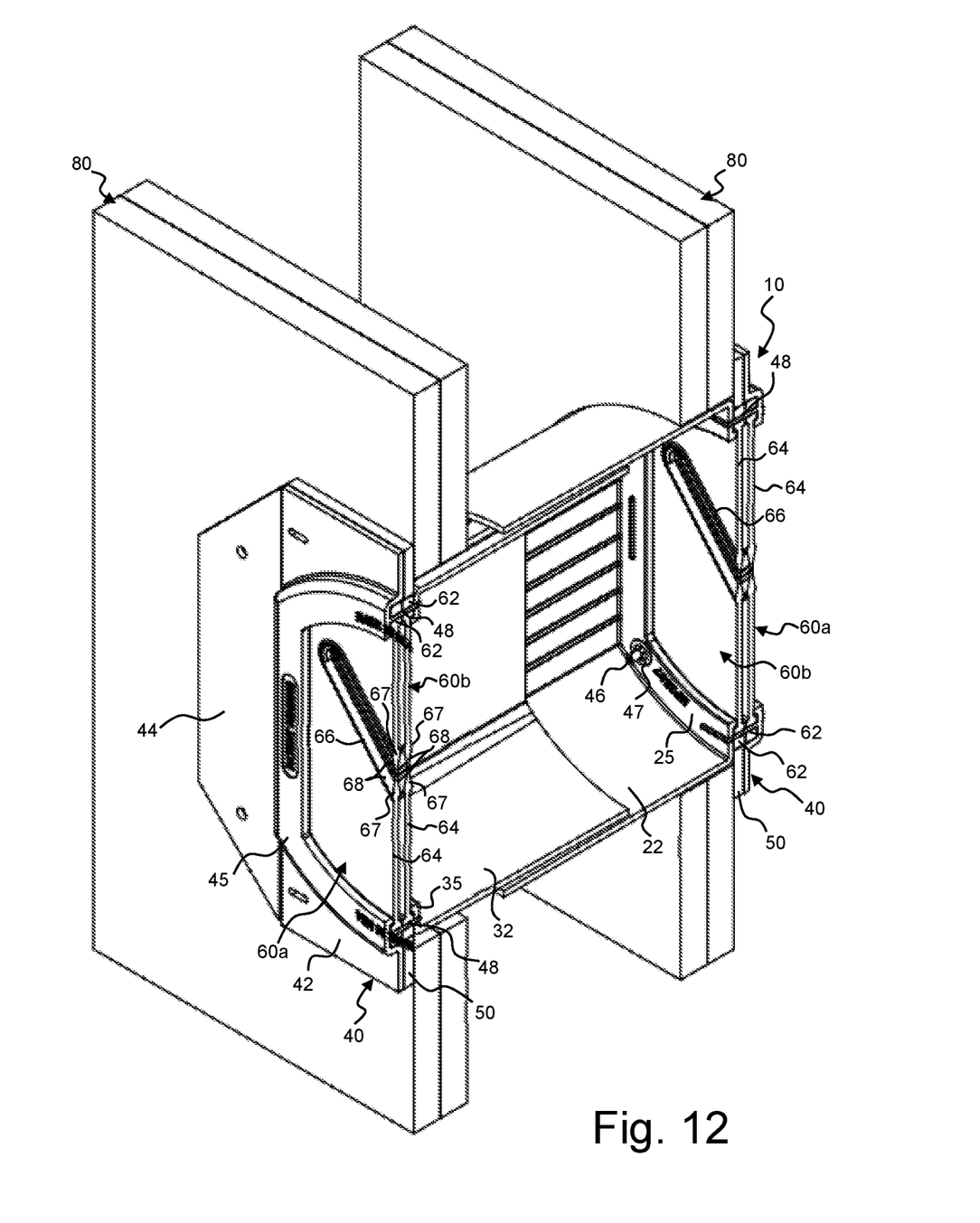
FIG. 12 is a cross-sectional perspective view of a self-sealing membrane sleeve assembly positioned within an opening in a wall structure.
Figure 13:
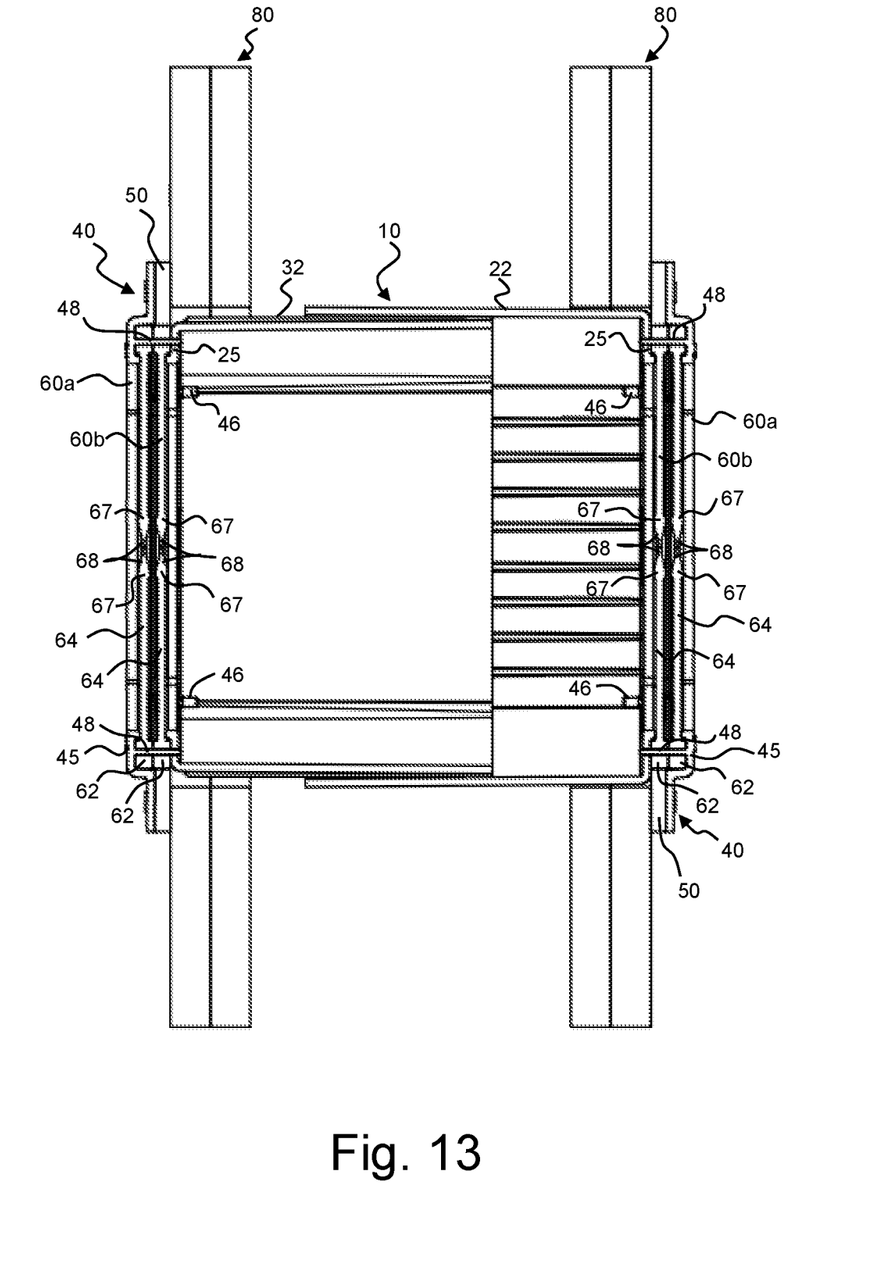
FIG. 13 is a cross-sectional elevation view of a self-sealing membrane sleeve assembly positioned within an opening in a wall structure.

Each flange 40 includes a body 42 extending about a through passage 43. In the illustrated embodiment, the body 42 includes score lines 49 which define breakoff tabs 44 which may facilitate ganging of multiple assemblies 10 as will be describe hereinafter. The body 42 defines a projecting portion 45 about the through passage 43, with the projecting portion 45 configured to house one or both of the sealing membranes 60a, 60b. With reference to FIGS. 12 and 13, in the illustrated embodiment one of the sealing membranes 60a is positioned within the projection 45 while the other sealing membrane 60b is surrounded by the foam gasket 50.

Each flange 40 includes a plurality of connector pins 46 and alignment tabs 48 extending linearly inward. Each of the connector pins 46 is configured to be engaged by a respective push-on nut 47 or the like. The connector pins 46 are configured to extend through openings 61 in each sealing membrane 60a, 60b and through a respective connector opening 28, 38. The portion of the pin 46 extending into the respective sleeve portion is engaged by a respective push-on nut 47 which engages the inside surface of the respective support face 25, 35 and thereby mounts the flange 40 to the respective sleeve portion 22, 32 (see FIG. 12). While connector pins and push-on nuts are illustrated herein, the invention is not limited to such and other mounting mechanisms, for example, screws, clips or the like may be utilized.

The alignment tabs 48 preferably have a wide configuration and extend through slots 63 in each of the sealing membranes 60a, 60b and into a respective tab opening 29, 39. The alignment tabs 48 thereby maintain the alignment of the sealing membranes 60a, 60b and prevent twisting or the like thereof when cables are passed therethrough. The flanges 40 are preferably made out of a thermoplastic material with properties that provide excellent impact properties and flame retardancy, however, the invention is not limited to such and the flanges may be made from other materials.

Each of the foam gaskets 50 includes a body 52 with a through passage 53. The through passage 53 may be slightly larger than the through opening 43 of the flange 43 such that the tabs 48 extend through the through passage 53 and support the gasket 50 relative to the flange 40 during assembly. The gasket body 52 has a configuration which complements the configuration of the flange 40. The sides 54 of the gasket body 52 may be trimmed to match the flange 40 if one or both of the tabs 44 are snapped off. The gasket 50 is preferably made from a flame retardant material, for example, a closed cell flame retardant Neoprene, which is designed to seal between the flange 40 and the wall opening restricting the passage of smoke and sound.

Figure 9:
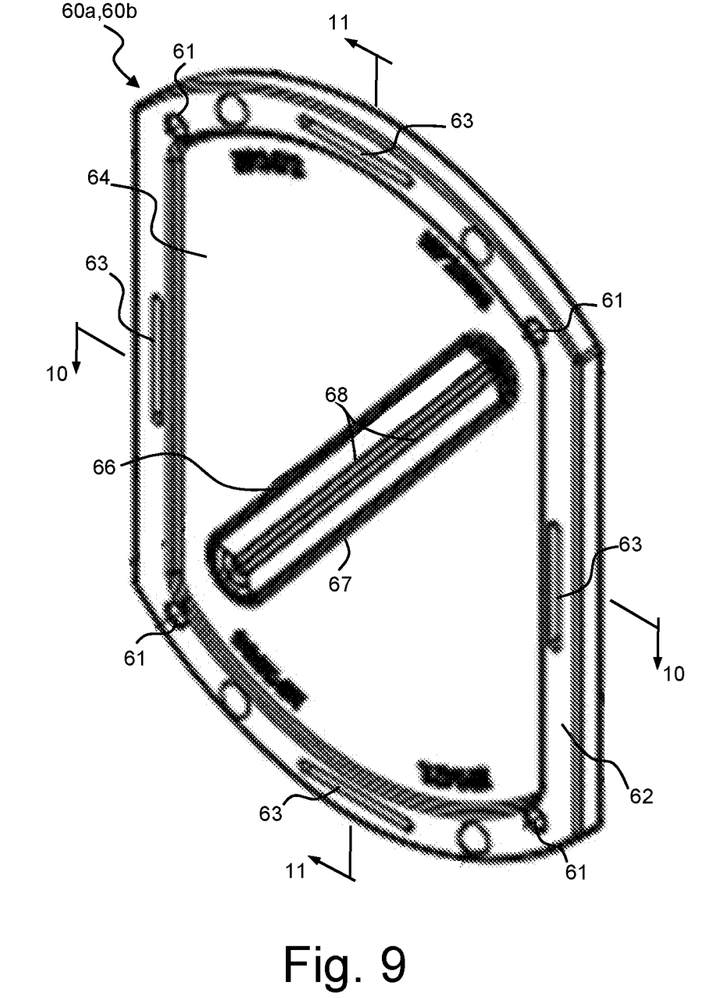
FIG. 9 is a perspective view of an exemplary sealing membrane.
Figure 10:
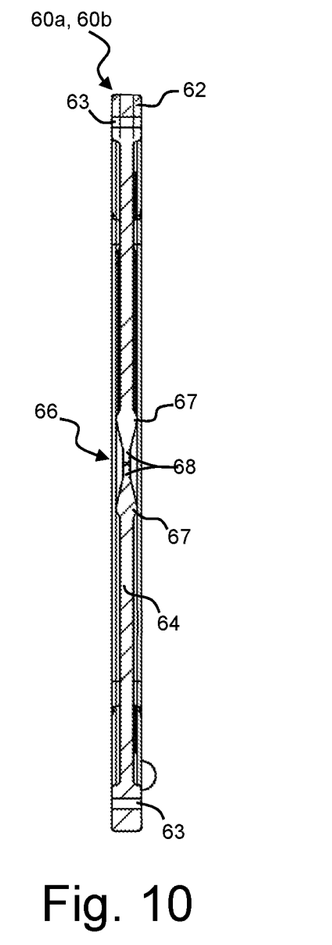
FIG. 10 is a cross-sectional view along the line 10-10 in FIG. 9.
Figure 11:
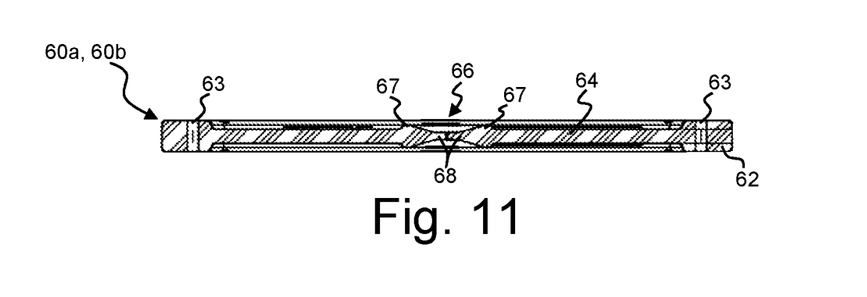
FIG. 11 is a cross-sectional view along the line 11-11 in FIG. 9.

Referring to FIGS. 9-11, an illustrative sealing membrane 60a, 60b will be described. The sealing membranes 60a, 60b are manufactured from a flexible material, preferably having a very low compression set and high elongation. An exemplary material is a Silicone based thermoset material. The sealing membranes 60a, 60b preferably each have the same configuration but are installed opposite one another, e.g. back to back, such that the sealed openings 66 extend at opposite angles and crisscross one another. Since the sealing membranes 60a, 60b are installed back to back, the sealed opening 66 of one of the membranes 60a extends at an acute angle while the sealed opening 66 of the other membrane 60b extends at an obtuse angle, thereby having the crisscross configuration.

Each sealing membrane 60a, 60b includes an outer rim 62 of increased thickness for mounting of the sealing membrane 60a, 60b. The openings 61, 63 are defined within the rim 62. A flexible panel 64 extends within the rim 62 with the axial, angled sealed opening 66 defined therethrough. In the illustrated embodiment, each sealed opening 66 extends at an approximately 45° relative to a plane extending sideways across the flange 40. The invention is not limited to such and the sealed openings 66 may extend at a different angle larger or smaller acute angle. In the illustrated embodiment, each sealed opening 66 has an oval shaped defined by a reinforced band 67, e.g. increased thickness, extending about sealing flaps 68 therein. The flexible reinforced band 67 provides mechanical support to keep the cable bundles passing therethrough centered. The oval shape creates a self-adjusting rubber band effect that is self-adjusting to varying sizes of cables and bundles. When the membranes 60a, 60b are installed in the proper manner they create bi axial contact around the bundle keeping the bundle centered and preventing a continuous path for air and sound to leak through. The axial orientation deflects and dissipates the smoke and sound reducing transmission through the opening. To prevent improper installation, the sealing membranes 60a, 60b may include a feature, e.g. a keying feature, molded therein.

Having generally described the components of an illustrative self-sealing membrane sleeve assembly 10, an exemplary installation will be described with respect to FIGS. 5, 6, 12 and 13. Each sealing membrane assembly 30 is secured to a respective sleeve member portion 22, 32 by passing the connector pins 46 and tabs 48 through the gasket through passage 53, through the openings 61, 63 of a first sealing membrane 60a in a first orientation, through the openings 61, 63 of the second sealing membrane 60b in a second, opposite orientation and then through the respective openings 28, 38, 29, 39, after which the connector pins 46 are engaged by the push-on nuts 47. As shown in FIG. 12, once the push-on nuts 47 engage within the connector pins 46, the flange 40 is secured to the respective sleeve member portion 22, 32 with the rims 62 of the sealing membranes 60a, 60b secured therebetween. The sleeve portions 22, 32 are extended through an opening in the building structure 80 (e.g. wall) from opposite sides thereof such that the inner portion 32 is received in the outer portion 22. The sleeve member portions 22, 32 are moved toward one another until the flanges 40 press the gaskets 50 against the building structure 80, providing a seal between the building structure 80 and the assembly 10. Screws or the like (not shown) may optionally be utilized to further secure the flanges 40 to the building structure 80.

Figure 17:
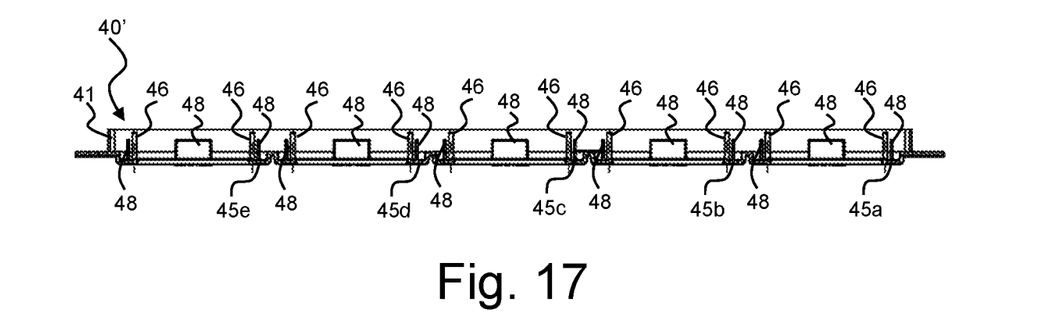
FIG. 17 is a cross-sectional view along the line 17-17 in FIG. 16.

Referring to FIGS. 14-17, a ganged self-sealing membrane sleeve assembly 10'. In the illustrated embodiment, each flange 40' defines a plurality of a projecting portions 45a-e extending about a respective through passage 43a-e. While the present embodiment shows five such projecting portions 45a-e and through passages 43a-3, the flange 40' may be configured with more or fewer projecting portions and through passages. The flange 40' is configured to support sealing membranes 60a, 60b and a respective sleeve portion 22a-22e/32a-32e in alignment with each through passage 43a-e. As illustrated in FIG. 17, the flange 40' defines a set of connector pins 46 and alignment tabs 48 within each projecting portion 45a-e to support the sealing membranes 60a, 60b and a respective sleeve portion 22a-22e/32a-32e in alignment with each through passage 43a-e. The flange 40' may include breakoff portion 44' to provide flexible configurations.

Figure 14:
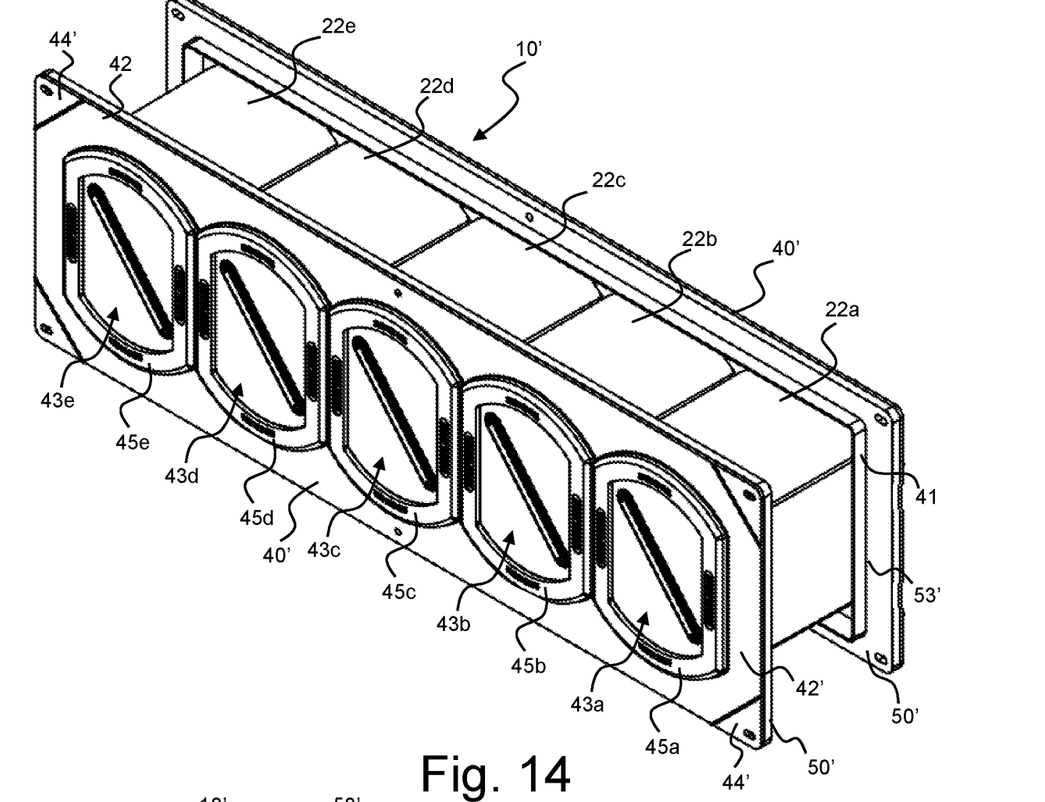
FIG. 14 is a perspective view of an exemplary ganged self-sealing membrane sleeve assembly in accordance with an embodiment of the invention.
Figure 15:
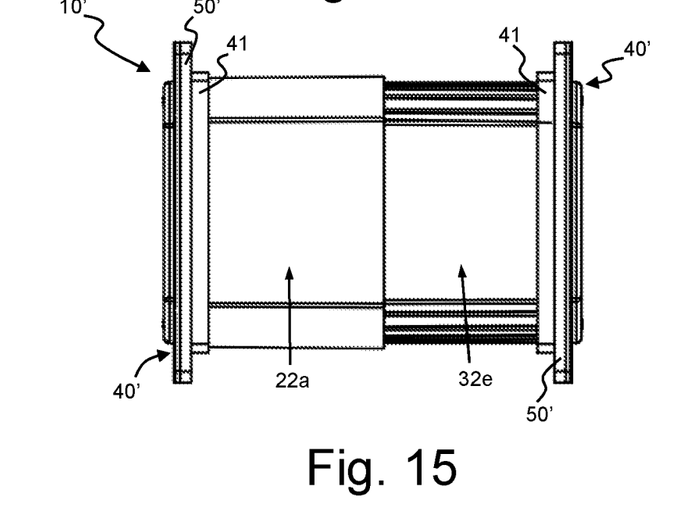
FIG. 15 is a side elevation view of the ganged self-sealing membrane sleeve assembly of FIG. 14 in an expanded configuration.
Figure 16:
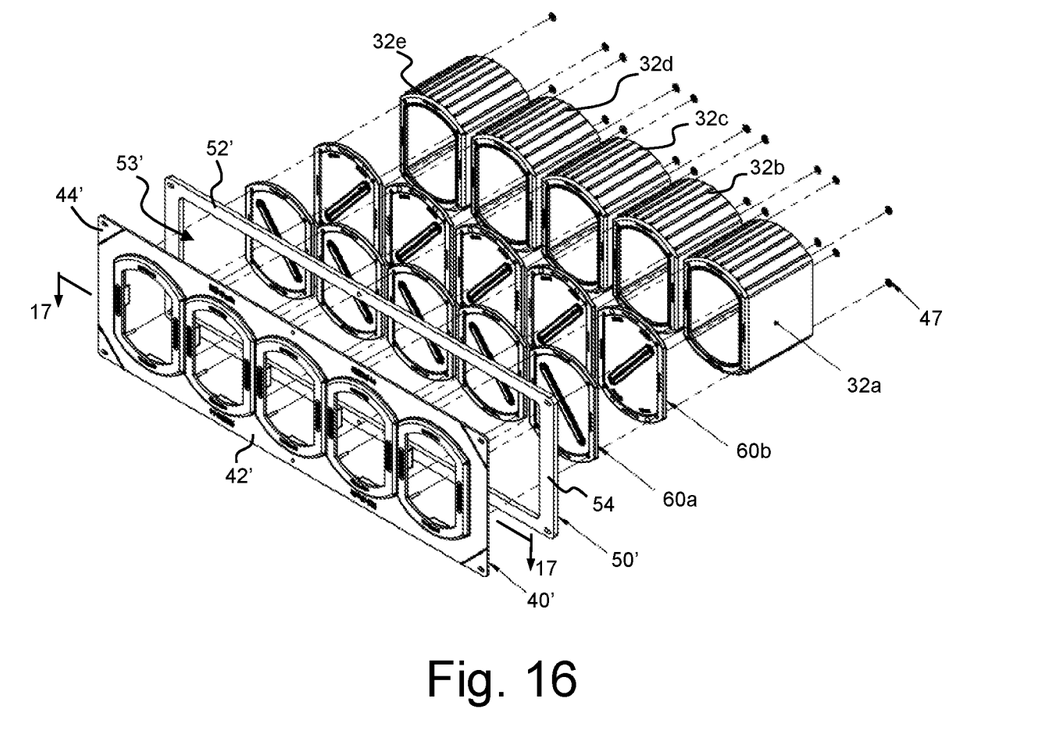
FIG. 16 is an exploded perspective view of an inner portion of the ganged self-sealing membrane sleeve assembly of FIG. 14.

To provide sealing about all of the through passages 43a-e, an internal rim 41 extends inward from the flange body 42 about each of the through passages 43a-e and the sleeve portions 22a-22e/32a-32e connected thereto (see FIG. 14). The sealing gasket 50' has a gasket body 52 which complements the configuration of the outer portion of the body 42' of the flange 40'. The gasket through passage 53' complements the configuration of the internal rim 41 such that the gasket 50' seals about the rim 41. In other aspects, the ganged self-sealing membrane sleeve assembly 10' is assembled and operates in a manner similar to the embodiment described above.

Figure 1:
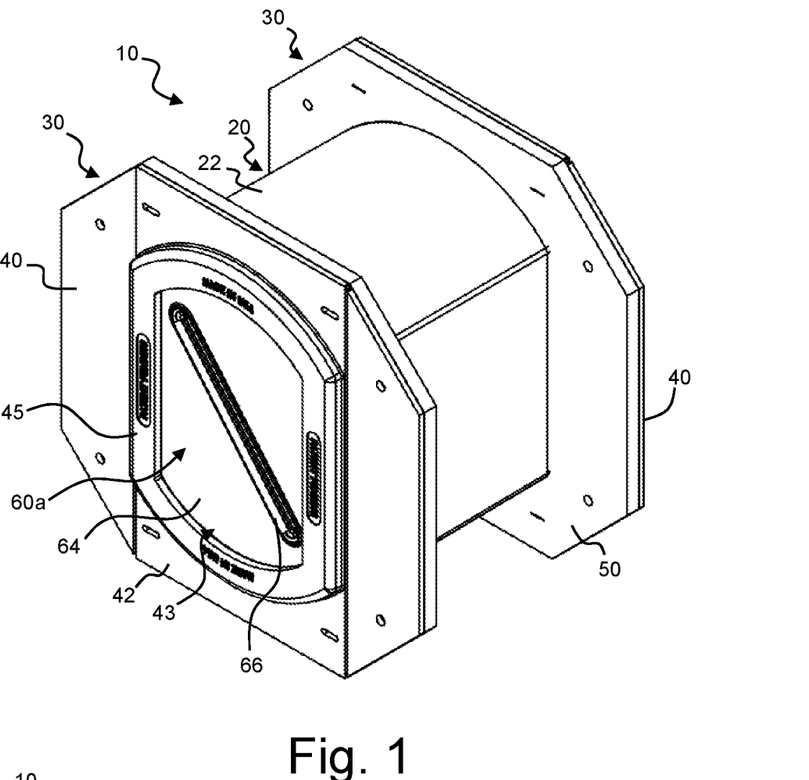
FIG. 1 is a front perspective view of an exemplary self-sealing membrane sleeve assembly in accordance with an embodiment of the invention.
Figure 2:
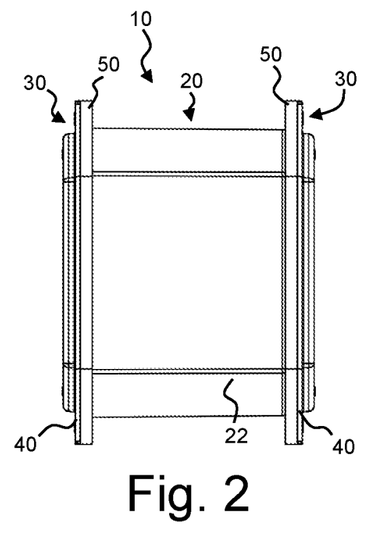
FIG. 2 is a side elevation view of the self-sealing membrane sleeve assembly of FIG. 1 in a contracted configuration.
Figure 3:
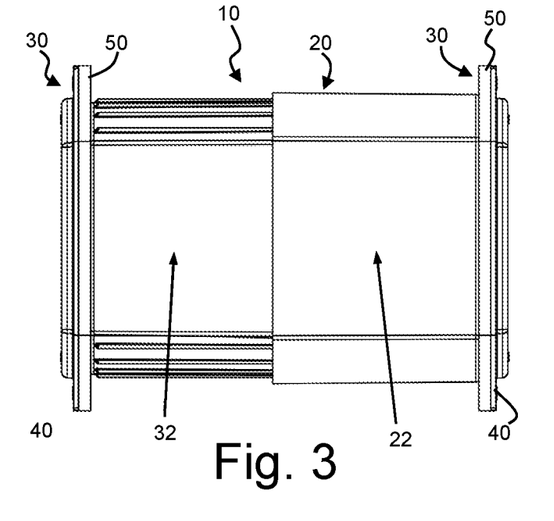
FIG. 3 is a side elevation view of the self-sealing membrane sleeve assembly of FIG. 1 in an expanded configuration.

While the embodiment illustrated in FIGS. 14-17 includes a unitary flange to define a ganged assembly, it is also possible to form a ganged assembly utilizing multiple self-sealing membrane sleeve assemblies 10 as illustrated in FIG. 1 positioned next to one another. Each of the self-sealing membrane sleeve assemblies would be assembled as described above. To facilitate a tight ganging of the assemblies, a left most flange 40 would have its right breakoff tab 44 removed, each of the middle flanges 40 (however many are desired from zero to many) have both breakoff tabs 44 removed, and the right most flange 40 would have its left breakoff tab 44 removed. As explained above, the sides of the gaskets 50 may be trimmed to complement the flanges 40 when the breakoff tabs are removed.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A sealing membrane assembly comprising:
   a flange having a body with a through passage;
   a first sealing membrane defining a first flexible panel with a first axial sealed opening extending therethrough, the first axial sealed opening extending at an acute angle; and
   a second sealing membrane defining a second flexible panel with a second axial sealed opening extending therethrough, the second axial sealed opening extending at an obtuse angle;
   wherein the first and second sealing membranes are secured relative to the flange such that the first and second axial sealed openings crisscross one another and the first and second sealing membranes seal the through passage and prevent passage through the through passage except through the first and second sealed openings.

2. The sealing membrane assembly according to claim 1 wherein each of the first and second sealed openings includes a reinforced band thereabout.

3. The sealing membrane assembly according to claim 2 wherein each of the first and second sealed openings includes sealing flaps extending within the reinforced band.

4. The sealing membrane assembly according to claim 2 wherein each reinforced band has an oval configuration.

5. The sealing membrane assembly according to claim 1 wherein each of the sealing membranes includes a rim of increased thickness about the flexible panel.

6. The sealing membrane assembly according to claim 5 wherein at least one elongate slot extends through the rim of each sealing membrane and a corresponding elongate alignment tab extends from the flange and through the elongate slot.

7. The sealing membrane assembly according to claim 5 wherein at least one mounting hole extends through the rim of each sealing membrane and a corresponding member extends from the flange and through the mounting hole.

8. The sealing membrane assembly according to claim 1 wherein the first and second axial sealed openings crisscross at a central axis of the through passage.

9. The sealing membrane assembly according to claim 1 wherein the first and second sealing membranes have identical configurations and are positioned back to back to achieve the differing angles of the axial sealed openings.

10. The sealing membrane assembly according to claim 1 further comprising a gasket positioned along the flange and extending about the through passage.

11. The sealing membrane assembly according to claim 1 wherein the flange defines a projecting portion about the through passage configured to receive at least one of the sealing membranes therein.

12. The sealing membrane assembly according to claim 1 wherein the flange defines at least one score line which facilitates snapping off at least a portion of the flange.

13. The sealing membrane assembly according to claim 1 wherein the flange defines a plurality of through passages and a pair of sealing membranes is secured relative to the flange in alignment with a respective through passage such that the first and second axial sealed openings crisscross one another and the pairs of the first and second sealing membranes seal each of the through passages except through the first and second sealed openings.

14. The sealing membrane assembly according to claim 13 further comprising a gasket positioned along the flange and extending about each of the through passages.

15. A self-sealing membrane sleeve assembly comprising:
a sleeve member having a tubular body extending between first and second ends;
a first sealing membrane assembly secured to the first end of the tubular body and a second sealing membrane assembly secured to the second end of the tubular body, the first and second sealing membranes each including:
a flange having a body with a through passage;
a first sealing membrane defining a first flexible panel with a first axial sealed opening extending therethrough, the first axial sealed opening extending at an acute angle; and
a second sealing membrane defining a second flexible panel with a second axial sealed opening extending therethrough, the second axial sealed opening extending at an obtuse angle;
wherein the first and second sealing membranes are secured relative to the flange such that the first and second axial sealed openings crisscross one another and the first and second sealing membranes seal the through passage except through the first and second sealed openings.

16. The self-sealing membrane sleeve assembly according to claim 15 wherein the tubular body has inner and outer portions which telescope relative to one another.

17. The self-sealing membrane sleeve assembly according to claim 16 wherein the inner and outer portions have a friction fit therebetween.

18. The self-sealing membrane sleeve assembly according to claim 15 wherein the sleeve member is an existing sleeve extending through a structure.

19. The self-sealing membrane sleeve assembly according to claim 15 wherein each of the first and second sealed openings includes a reinforced band thereabout.

20. The self-sealing membrane sleeve assembly according to claim 19 wherein each reinforced band has an oval configuration.

* * * * *